3,072,650
AMIDES OF 2-(AMINOMETHYL)-OXACYCLO-
ALKANES
Joseph Semb, Pearl River, and James Robert Vaughan,
Jr., New York, N.Y., assignors to American Cyanamid
Company, New York, N.Y., a corporation of Maine
No Drawing. Filed Feb. 17, 1961, Ser. No. 89,932
5 Claims. (Cl. 260—240)

This invention relates to certain amides of 2-(aminomethyl) derivatives of polymethylene oxides and, more particularly, is concerned with novel compounds which may be represented by the following general formula:

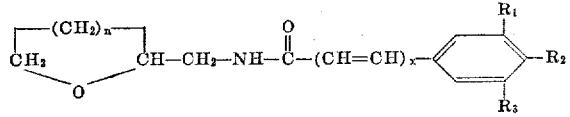

wherein $R_1$, $R_2$ and $R_3$ are lower alkoxy, $x$ has the value of 0 or 1, and $n$ is an integer from 1 to 4. Suitable lower alkoxy substituents are methoxy and ethoxy.

The novel compounds of the present invention are, in general, white crystalline solids, sparingly soluble in water, but relatively soluble in organic solvents such as lower alkanols, esters, ketones, dioxane, dimethylformamide and the like.

The novel compounds of the present invention have useful pharmacological properties. They are depressants of the central nervous system, and upon administration they produce a state of tranquillity in man and animals with minimum side effects. These compounds also are effective in reducing gastric acidity, and are hypotensive agents. The dosage required to produce a tranquillizing effect without noticeable toxic side effects varies between about 50 mg. and 500 mg. per individual dose. The dosage regimen may be adjusted to provide the optimum therapeutic response. For example, several doses may be administered daily, or the dose may be proportionately reduced as indicated by the exigencies of the therapeutic situation.

The novel compounds of the present invention may be readily prepared by the interaction of a 2-(aminomethyl)-oxacycloalkane with a reactive derivative of a 3,4,5-trialkoxybenzoic acid or of a 3,4,5-trialkoxycinnamic acid, such as the acid halide, acid anhydride or ester. Suitable 2-(aminomethyl)-oxacycloalkanes are, for example, 2-(aminomethyl)-oxacyclobutane, furfurylamine, 2-aminomethyltetrahydropyran, and 2-(aminomethyl)-oxacycloheptane.

The conversion of the 3,4,5-trialkoxybenzoic and 3,4,5-trialkoxycinnamic acids to the corresponding acid halides may be carried out by means of various reagents. For this purpose there may be used phosphorus trichloride, phosphorus tribromide, phosphorus pentachloride, phosphorus pentabromide, phosphorus oxychloride, sulfuryl chloride or thionyl chloride. However, we prefer to use thionyl chloride for the preparation of the corresponding intermediate acid chlorides. The reaction may be carried out at temperatures ranging from about 20° C. to about 100° C. in the absence of a solvent or in a solvent which will not enter into the reaction under the conditions employed. Such solvents may be, for example, chloroform, methylene chloride, benzene, and the like. The resulting acid halide is then treated with an appropriate 2-(aminomethyl)-oxacycloalkane whereby the corresponding amide is obtained. This reaction may be carried out at temperatures ranging from about 0° C. to about 100° C. For convenience, it is preferred to carry out the reaction in a solvent which will not enter into the reaction under the conditions employed. Solvents which may be used are, for example, benzene, toluene, tetrahydrofuran, chloroform, diethylene glycol dimethyl ether, and the like. An acid acceptor such as sodium hydroxide, sodium carbonate, or potassium carbonate may also be employed. In some cases the 2-(aminomethyl)-oxacycloalkane may act as its own acid acceptor by employing a two-fold excess thereof.

The conversion of the 3,4,5-trialkoxybenzoic and 3,4,5-trialkoxycinnamic acids to the corresponding acid anhydrides may be readily achieved by the interaction of a 3,4,5-trialkoxybenzoic acid or a 3,4,5-trialkoxycinnamic acid with its corresponding acid halide. The resulting acid anhydride is then treated with an appropriate 2-(aminomethyl)-oxacycloalkane whereby the corresponding amide is obtained. This reaction may be carried out at temperatures ranging from about 50° C. to about 100° C. Solvents which may be used are, for example, chloroform, toluene, tetrahydrofuran, and the like.

The lower alkyl esters of the 3,4,5-trialkoxybenzoic acids or 3,4,5-trialkoxycinnamic acids may be readily prepared by standard esterification procedures. The amidation of these intermediate esters may be brought about by treatment with an appropriate 2-(aminomethyl)-oxacycloalkane under conditions well-known in the art.

Alternatively, the novel compounds of the present invention may be prepared by metallating the amide of a 3,4,5-trialkoxybenzoic acid or of a 3,4,5-trialkoxycinnamic acid, e.g. with sodium amide or lithium amide, and then reacting the metallated amide with an appropriate 2-(halomethyl)-oxacycloalkane. This reaction may be carried out in an inert solvent such as ether, dioxane, tetrahydrofuran, and the like, at temperatures ranging from about 0° C. to about 80° C.

The invention will be described in greater detail in conjunction with the following specific examples.

EXAMPLE 1

N-(2-Tetrahydropyranylmethyl)-3,4,5-Trimethoxybenzamide

A solution of 6.9 g. of 3,4,5-trimethoxybenzoyl chloride and 8 ml. of 2-aminomethyltetrahydropyran in 50 ml. of chloroform was heated at reflux temperature for 15 minutes. The reaction mixture was then extracted twice with water, and the residual chloroform phase was dried over anhydrous sodium sulfate. The chloroform was then removed under reduced pressure and the solid residue was recrystallized from benzene. There was thus obtained 6.3 g. of N-(2-tetrahydropyranylmethyl)-3,4,5-trimethoxybenzamide, M.P. 125–126° C.

EXAMPLE 2

N-(2-Tetrahydropyranylmethyl)-3,4,5-Trimethoxycinnamamide

A solution of 8.7 g. of 3,4,5-trimethoxycinnamoyl chloride and 8 ml. of 2-aminomethyltetrahydropyran in 50 ml. of chloroform was heated at reflux temperature for 15 minutes. The product was isolated as in Example 1. Recrystallization from benzene gave 6.4 g. of white, crystalline, N-(2-tetrahydropyranylmethyl)-3,4,5-trimethoxycinnamamide, M.P. 116–117° C.

EXAMPLE 3

N-(Tetrahydrofurfuryl)-3,4,5-Trimethoxybenzamide

A solution of 4.6 g. of 3,4,5-trimethoxybenzoyl chloride and 10 ml. of furfurylamine in 20 ml. of diethylene glycol dimethyl ether was heated at steam-bath temperature for 15 minutes. The reaction mixture was then diluted with 100 ml. of water whereupon the product precipitated as a white solid. This was removed by filtration and recrystallized from ethyl acetate whereby there was obtained 5.0 g. of crystalline N-(tetrahydrofurfuryl)-3,4,5-trimethoxybenzamide, M.P. 144–145° C.

EXAMPLE 4

*N-(Tetrahydrofurfuryl)-3,4,5-Trimethoxycinnamamide*

A solution of 5.1 g. of 3,4,5-trimethoxycinnamoyl chloride and 10 ml. of furfurylamine in 20 ml. of diethylene glycol dimethyl ether was heated at steam-bath temperature for 15 minutes. The product was isolated as in Example 3. Recrystallization from ethyl acetate gave 3.0 g. of white, crystalline, N-(tetrahydrofurfuryl)-3,4,5-trimethoxycinnamamide, M.P. 105–107° C.

What is claimed is:

1. A compound of the formula:

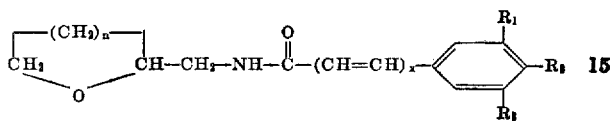

wherein $R_1$, $R_2$ and $R_3$ are lower alkoxy, $x$ has a value selected from the group consisting of 0 and 1, and $n$ is an integer from 1 to 4.

2. N-(tetrahydrofurfuryl)-3,4,5-trimethoxybenzamide.
3. N-(tetrahydrofurfuryl) - 3,4,5 - trimethoxycinnamamide.
4. N-(2-tetrahydropyranylmethyl) - 3,4,5 - trimethoxybenzamide.
5. N-(2-tetrahydropyranylmethyl) - 3,4,5 - trimethoxycinnamamide.

References Cited in the file of this patent

UNITED STATES PATENTS

| | | |
|---|---|---|
| 2,870,145 | Perron | Jan. 20, 1959 |
| 2,987,544 | Horrom | June 6, 1961 |

OTHER REFERENCES

Degering: An Outline of Organic Nitrogen Compounds, pub. by University Lithoprinters, 1950, pages 397–399.